United States Patent
Jeong

(10) Patent No.: US 10,425,607 B2
(45) Date of Patent: Sep. 24, 2019

(54) DISPLAY APPARATUS WITH LIGHT RECEIVING PART FOR SENSING EXTERNAL LIGHT

(71) Applicant: LG ELECTRONICS INC., Seoul (KR)

(72) Inventor: Kyungmin Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 41 days.

(21) Appl. No.: 15/716,383

(22) Filed: Sep. 26, 2017

(65) Prior Publication Data

US 2018/0103228 A1    Apr. 12, 2018

(30) Foreign Application Priority Data

Oct. 10, 2016  (KR) .......................... 10-2016-0130596

(51) Int. Cl.
*H04N 5/44*    (2011.01)
*H04N 5/655*   (2006.01)

(52) U.S. Cl.
CPC .......... *H04N 5/4403* (2013.01); *H04N 5/655* (2013.01)

(58) Field of Classification Search
CPC .............................. H04N 5/4403; H04N 5/655
See application file for complete search history.

(56) References Cited

U.S. PATENT DOCUMENTS

2009/0225502 A1  9/2009  Cheng et al.
2013/0155041 A1* 6/2013  Yanai ............... G09G 5/003
                                                 345/207

FOREIGN PATENT DOCUMENTS

| CN | 102568333     | 7/2012    |
| JP | H07020759     | 4/1995    |
| JP | 2000244135    | 9/2000    |
| KR | 1020100127475 | * 12/2010 |

OTHER PUBLICATIONS

PCT International Application No. PCT/KR2017/011114, International Search Report dated Feb. 5, 2018, 3 pages.

* cited by examiner

*Primary Examiner* — Lisa S Landis
(74) *Attorney, Agent, or Firm* — Lee, Hong, Degerman, Kang & Waimey PC

(57) ABSTRACT

Disclosed is a display apparatus including a display panel, a main frame disposed at the rear of the display panel, a sensing module support member including a front part that defines the front surface thereof and extends along the edge of the display panel, the front part having a transmission part disposition hole formed therethrough in the forward-rearward direction, and a rear protrusion protruding toward the rear of the front part so as to be coupled to the main frame, the rear protrusion having a module cabinet disposition recess formed at the rear of the transmission part disposition hole, and a sensing module including a module cabinet that defines opposite side surfaces thereof and is inserted and fixed in the module cabinet disposition recess, a transmission part disposed in the transmission part disposition hole for transmitting light that is incident from the front thereof, and a light receiving part for sensing the transmitted light.

18 Claims, 15 Drawing Sheets

[FIG. 1]
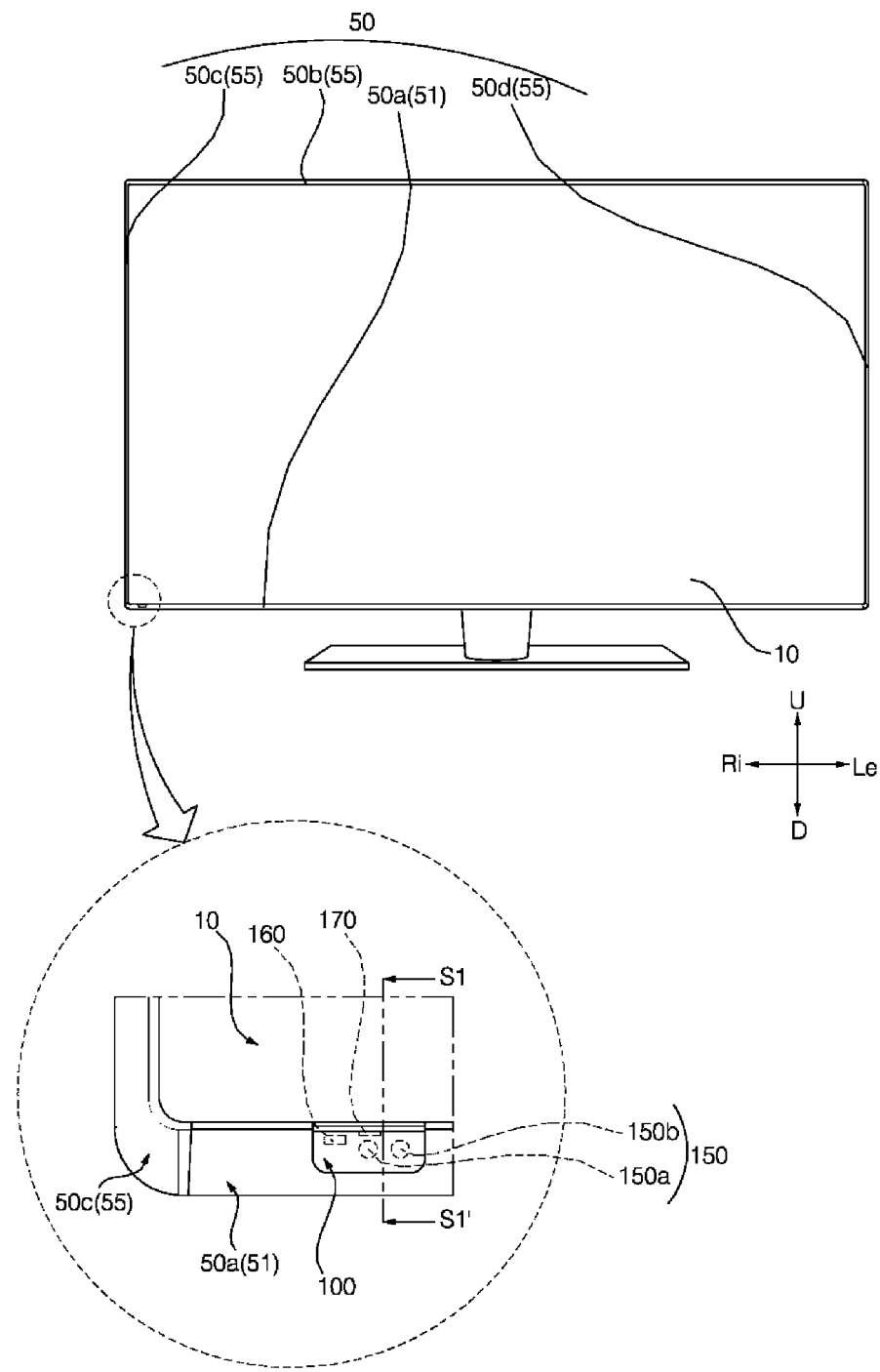

[FIG. 2]
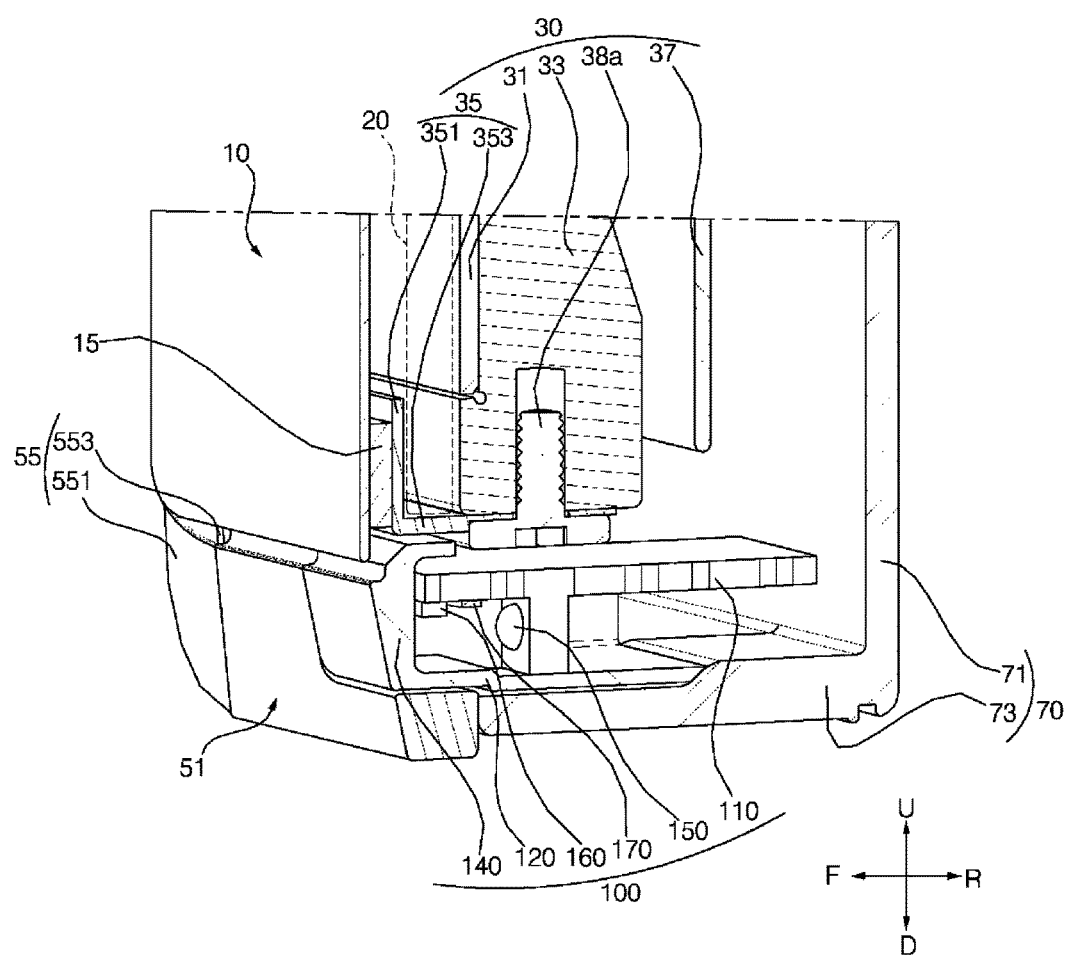

[FIG. 3]
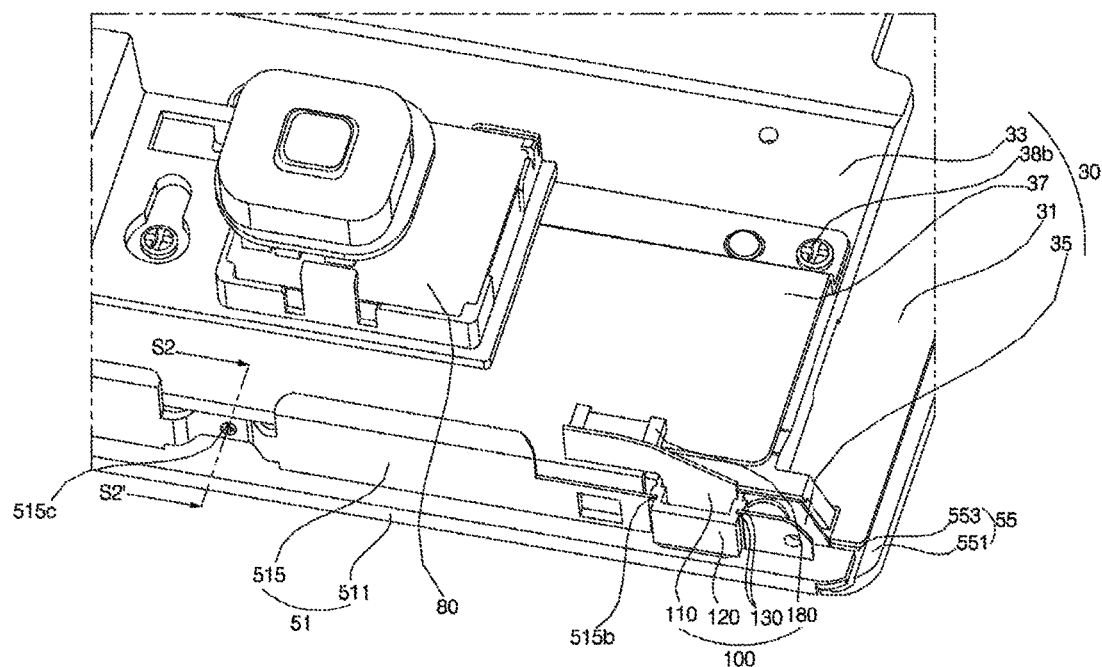

[FIG. 4]
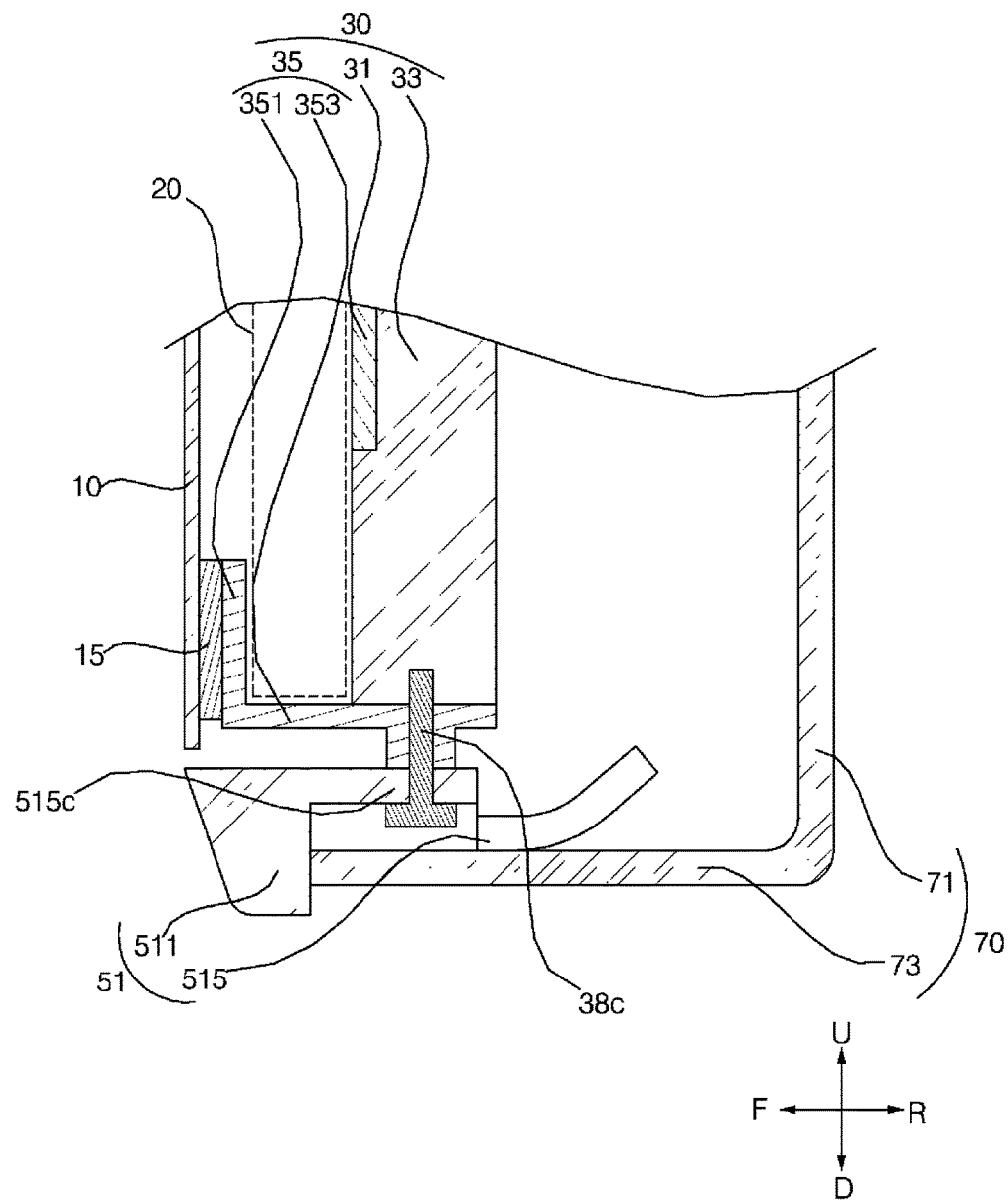

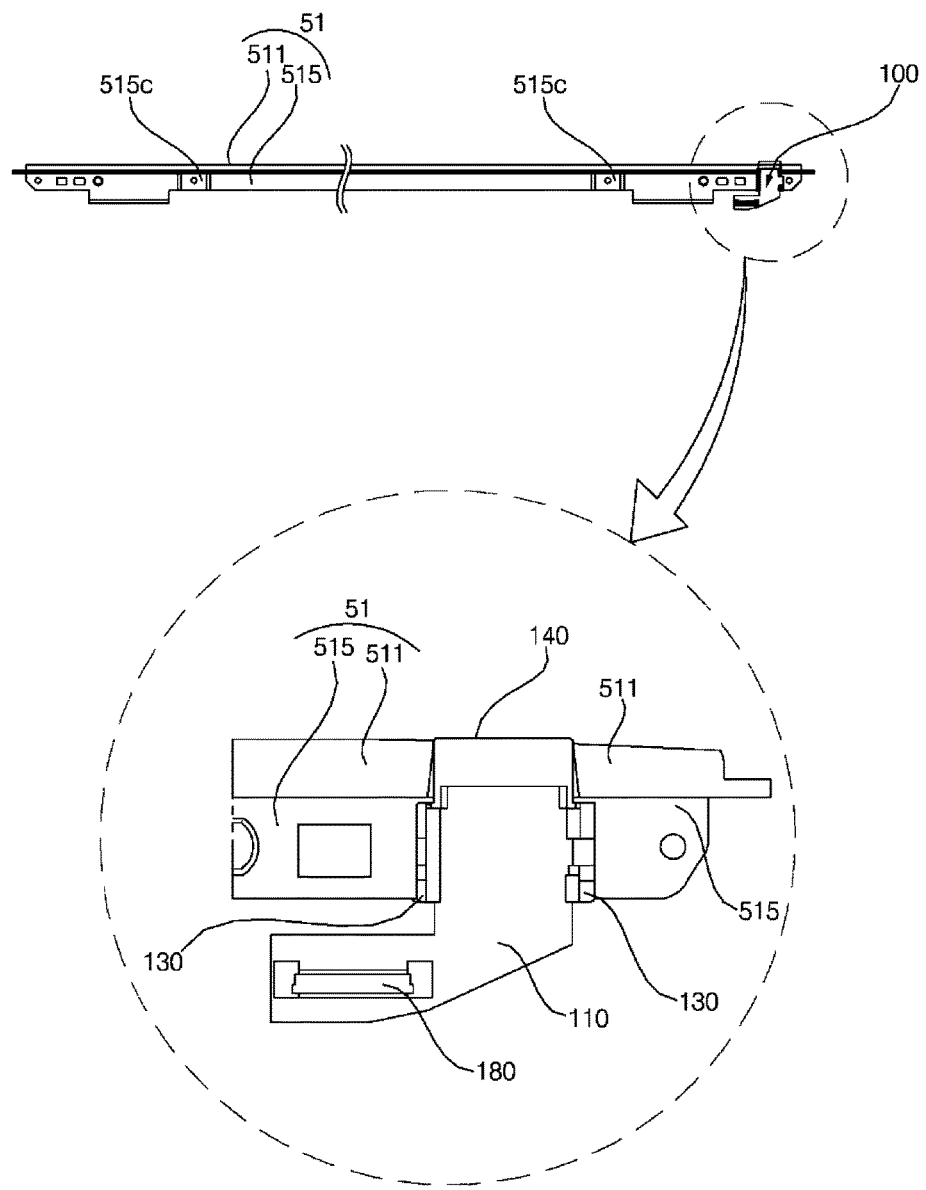

[FIG. 6]
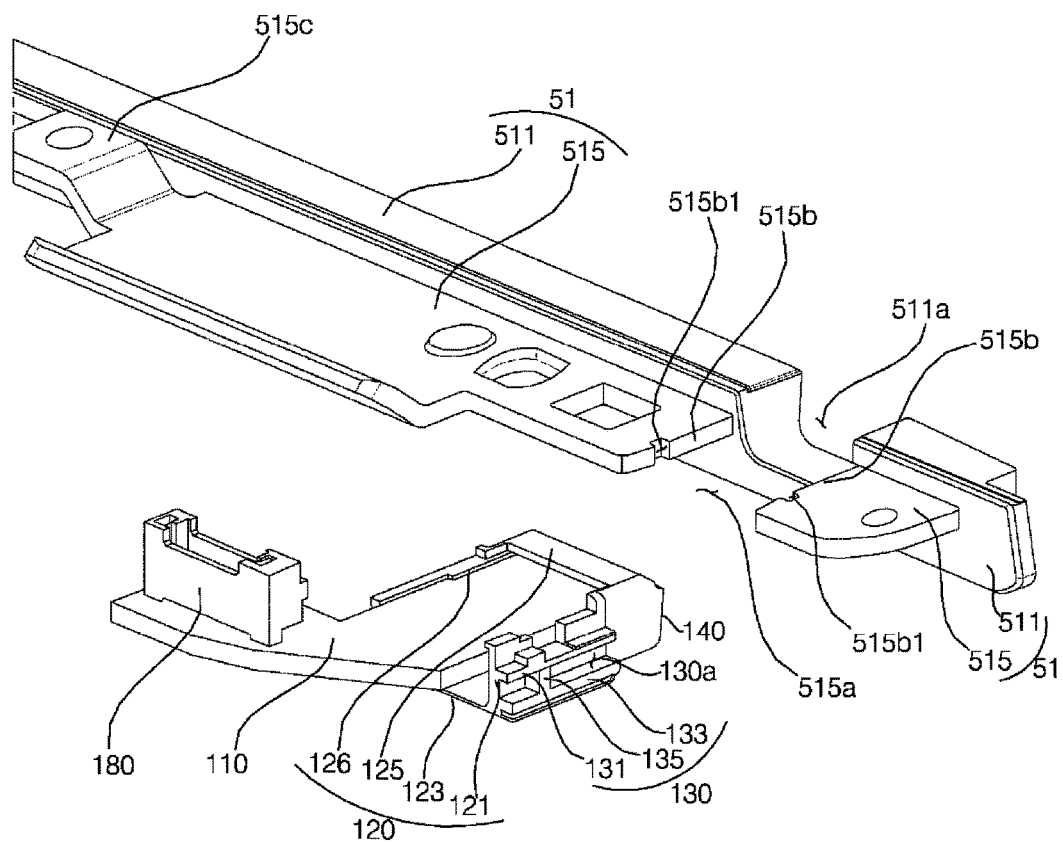

[FIG. 7]
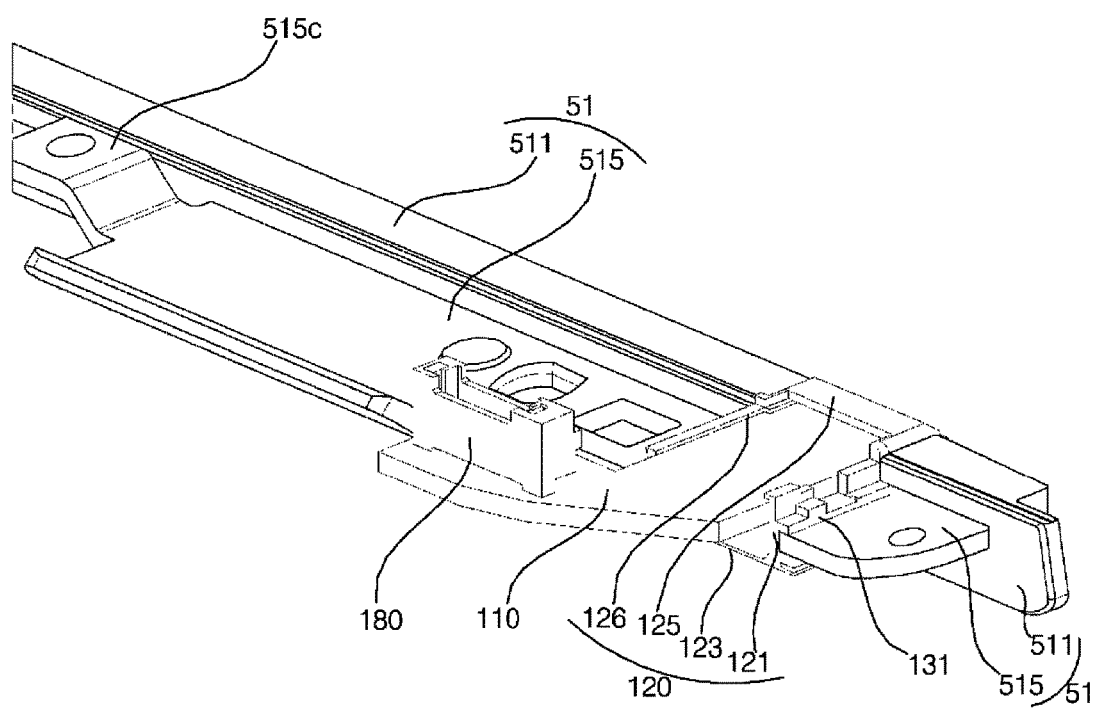

[FIG. 8]
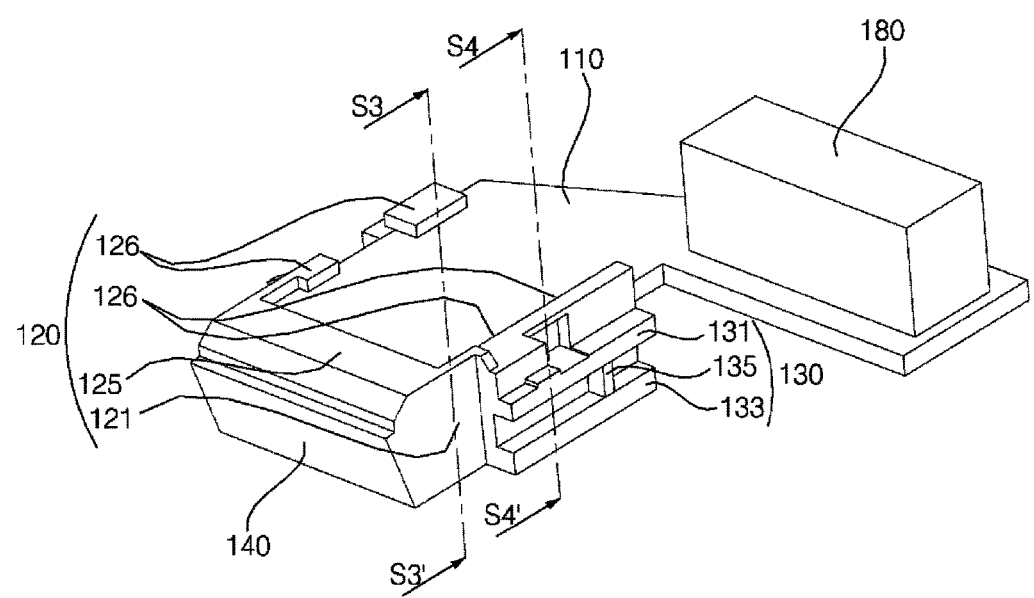

[FIG. 9]
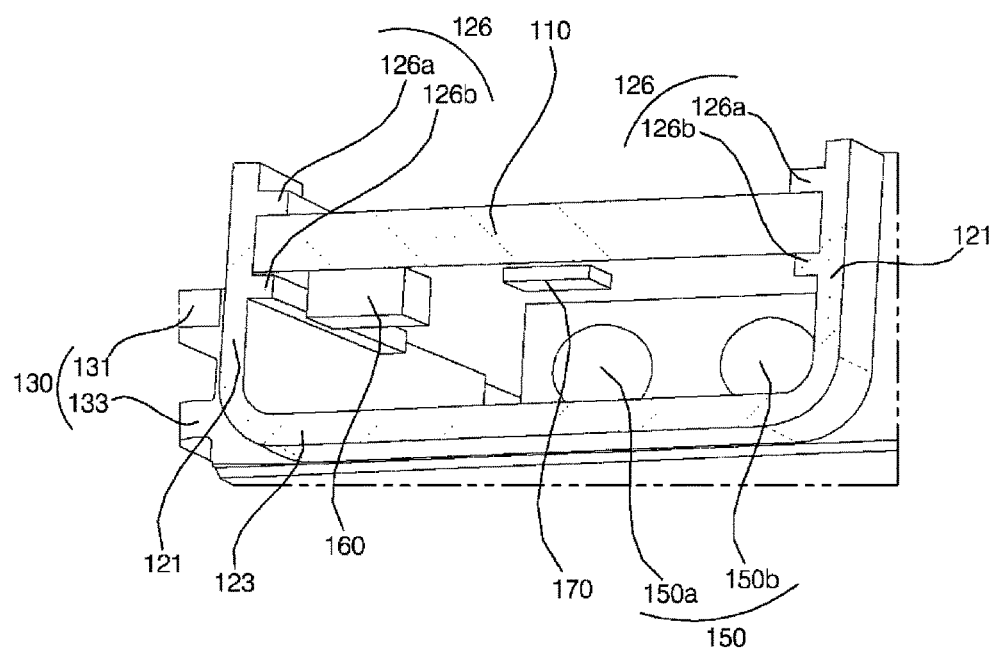
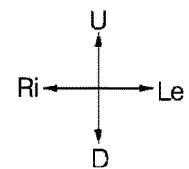

[FIG. 10a]
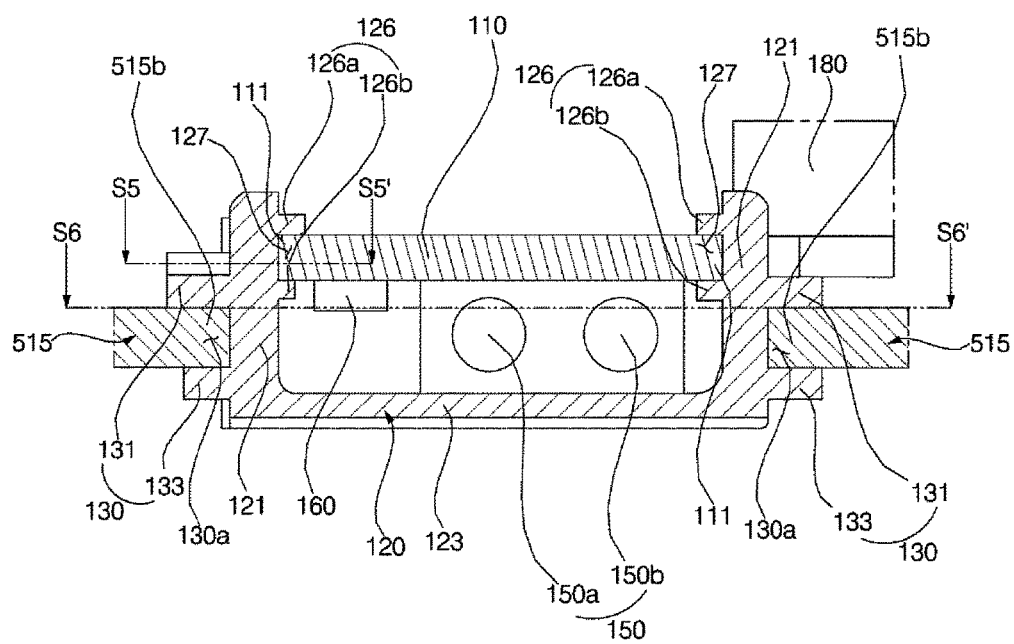

[FIG. 10b]
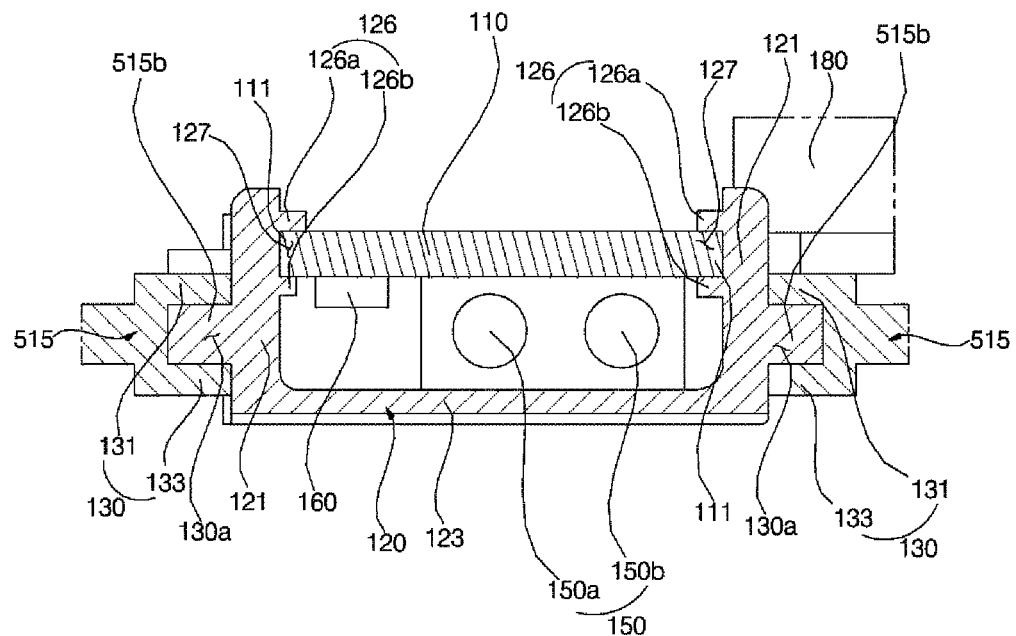
[FIG. 10c]
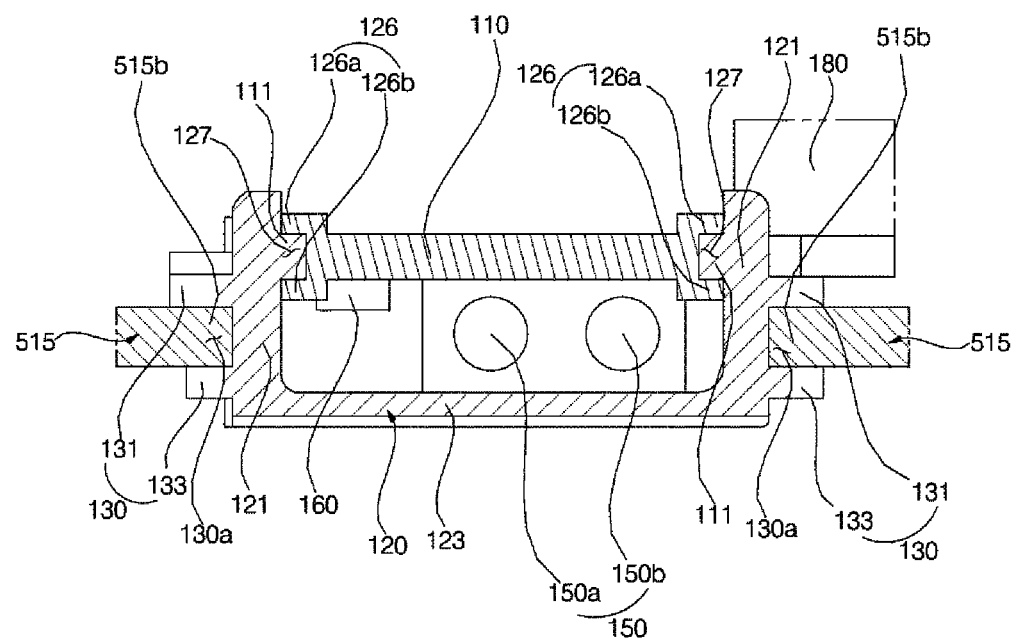

[FIG. 11a]
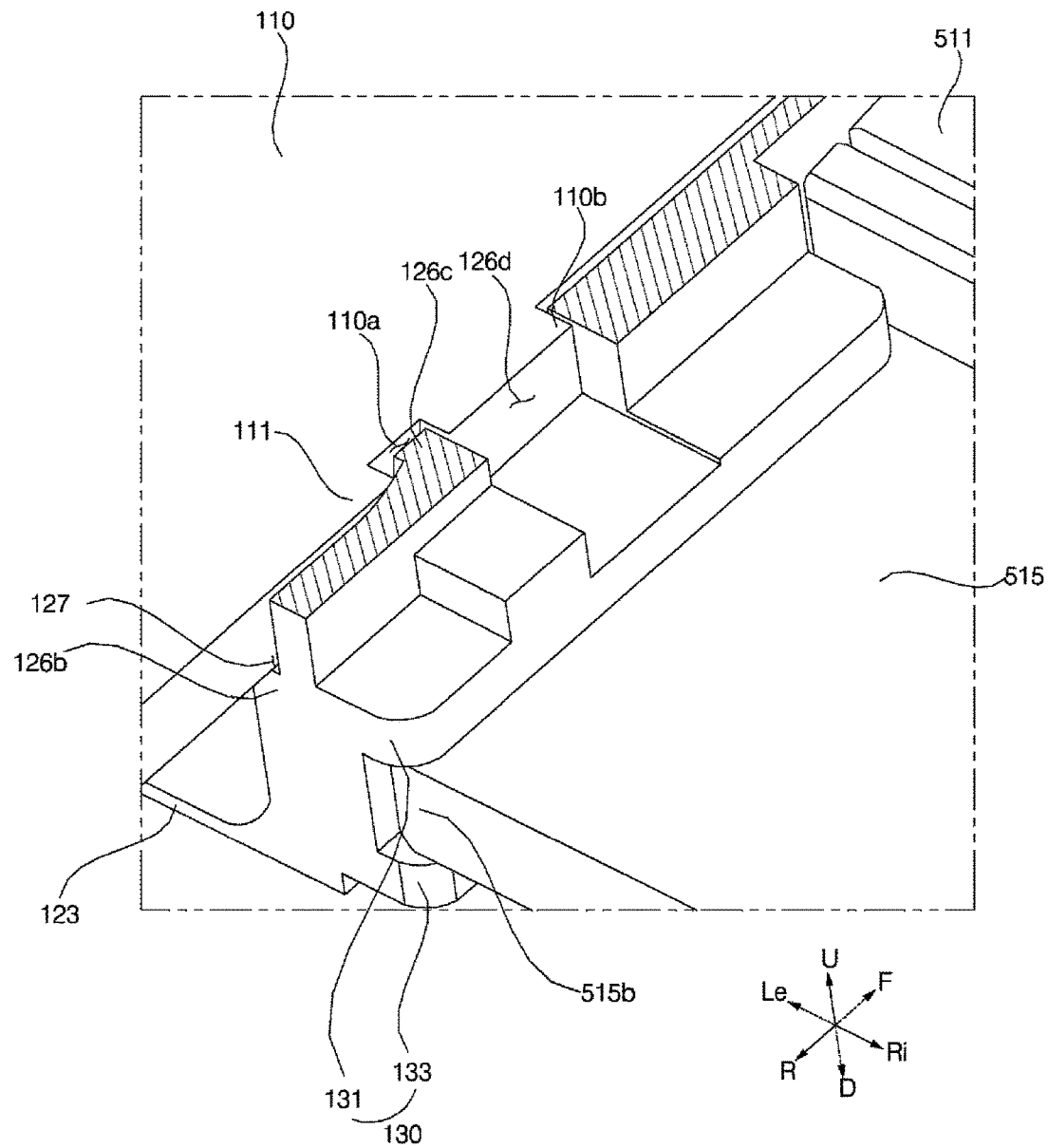

[FIG. 11b]
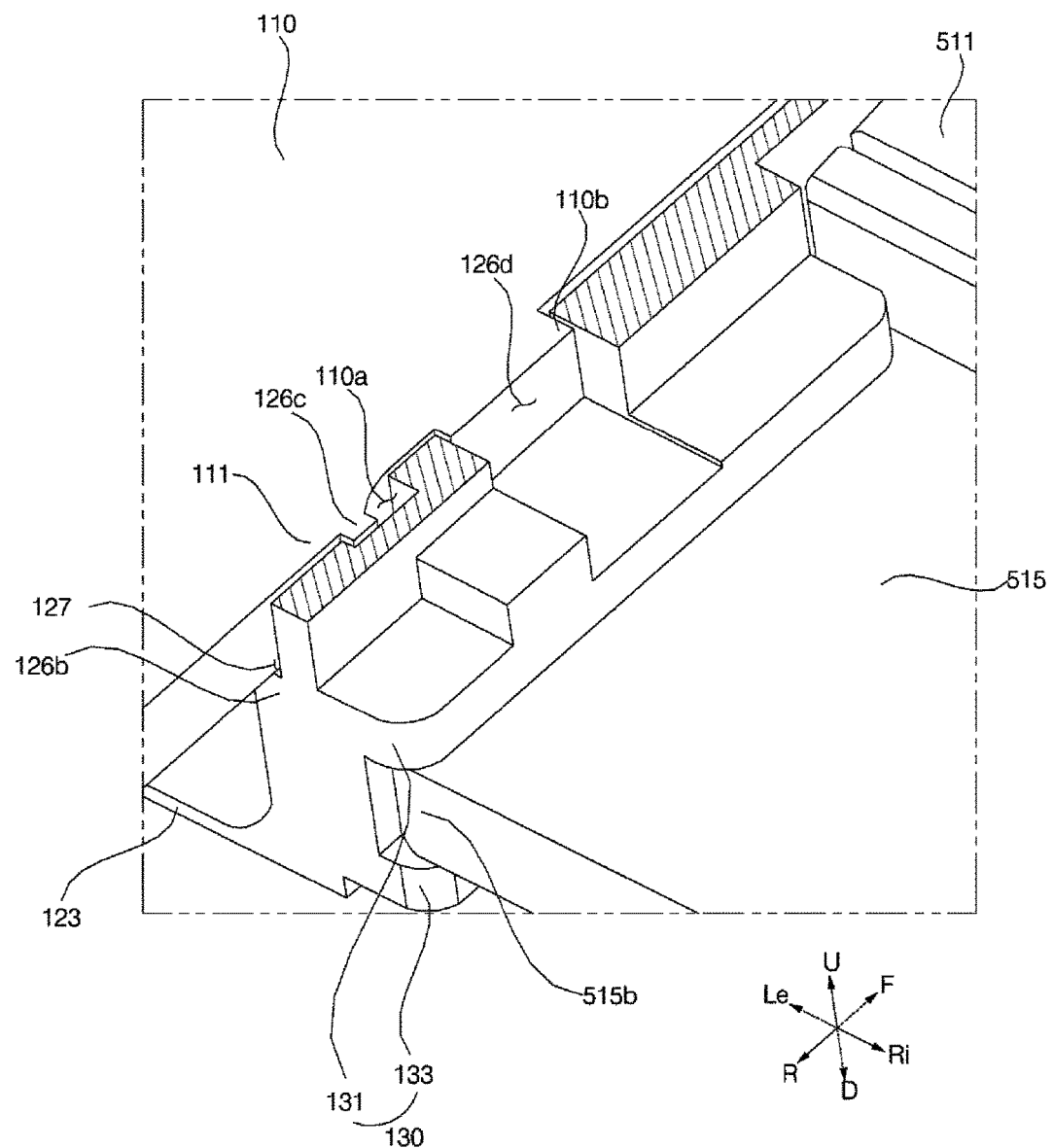

[FIG. 12a]
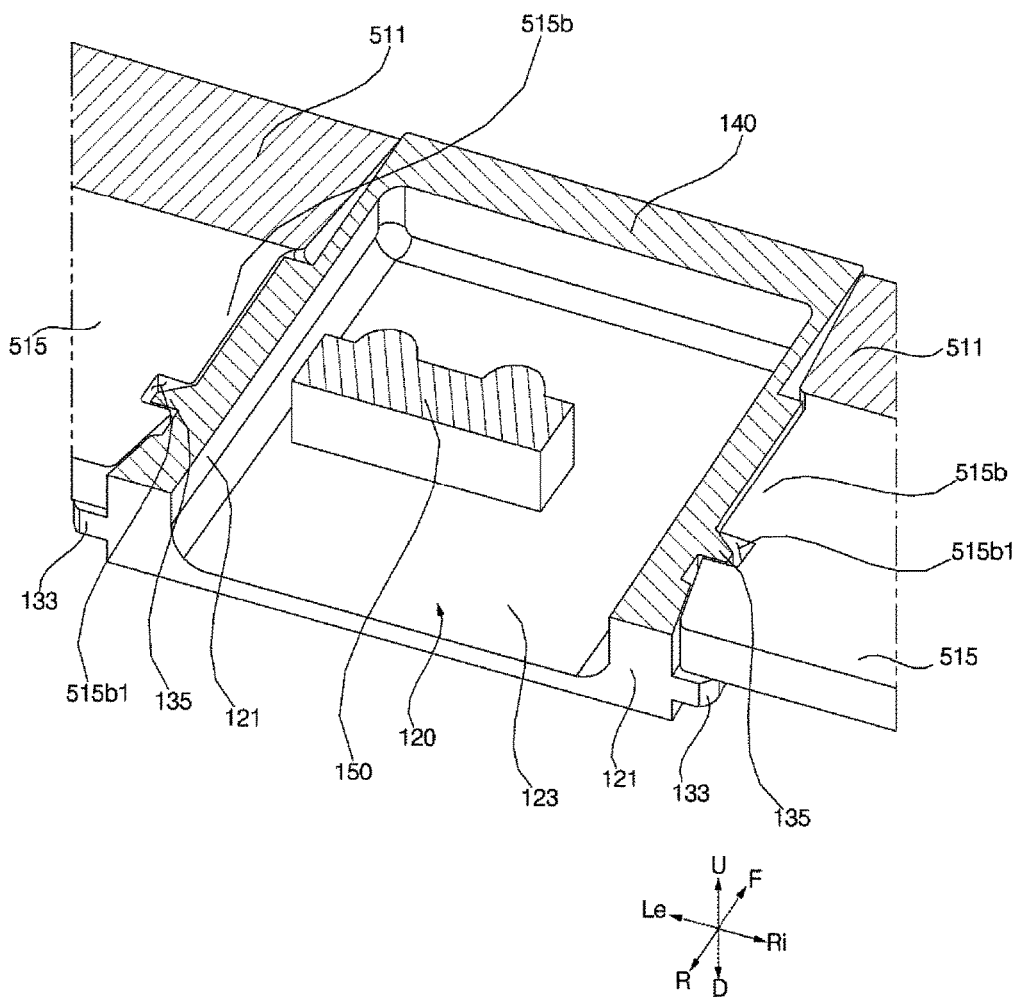

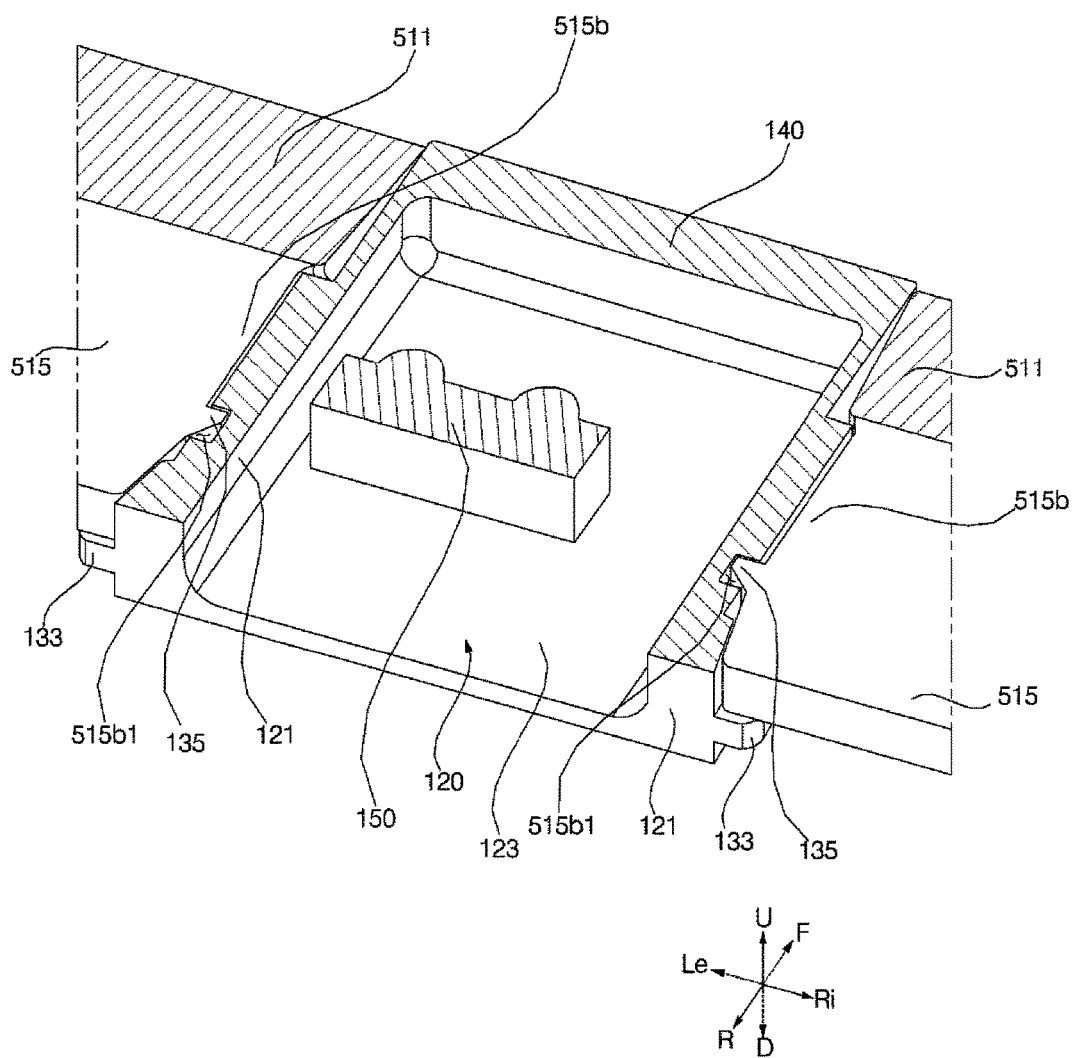
【FIG. 12b】

DISPLAY APPARATUS WITH LIGHT RECEIVING PART FOR SENSING EXTERNAL LIGHT

CROSS-REFERENCE TO RELATED APPLICATION

Pursuant to 35 U.S.C. § 119(a), this application claims the benefit of earlier filing date and right of priority to Korean Patent Application No. 10-2016-0130596, filed on Oct. 10, 2016, the contents of which are hereby incorporated by reference herein in its entirety.

BACKGROUND OF THE INVENTION

1. Field of the Invention

The present invention relates to a display apparatus including a light receiving part for sensing external light.

2. Description of the Related Art

There are various types of display panels that display images. Examples of the display panels include a liquid crystal display panel, a plasma display panel, and an organic light emitting diode display panel. A thin film transistor liquid-crystal display (TFT-LCD) type display apparatus is an example of a display apparatus including a liquid crystal display panel. This type of display apparatus includes a backlight unit having a cold cathode fluorescent lamp (CCFL) or a light emitting diode (LED) as a light source.

A conventional display apparatus includes a light receiving part for an infrared (IR) signal to remotely control the output of an image on a display panel. In addition, the conventional display apparatus further includes a lower frame extending along the lower edge of the display panel. The infrared light receiver is coupled to the lower side of the lower frame.

SUMMARY OF THE INVENTION

In the conventional display apparatus, a structure for fixing the light receiving part to the lower side of the lower frame protrudes, since the light receiving part is coupled to the lower side of the lower frame. As a result, the lower surface of the apparatus is not smooth, and the area of the front surface of the apparatus is increased. It is a first object of the present invention to provide a compressor driving apparatus configured such that the external appearance of the apparatus is smooth and such that a light receiving part is fixed while the area of the front surface of the apparatus is reduced.

It is a second object of the present invention to provide a compressor driving apparatus configured such that a light receiving part is fixed using a frame structure disposed at the edge of a display panel.

It is a third object of the present invention to provide a compressor driving apparatus including a module structure for supporting a light receiving part and configured such that the module structure is easily inserted and fixed into a frame structure disposed at the edge of a display panel.

It is a fourth object of the present invention to provide a compressor driving apparatus configured such that a display panel and a light receiving part are stably supported using a minimum structure.

In accordance with the present invention, the above and other objects can be accomplished by the provision of a display apparatus including a display panel, a main frame disposed at a rear of the display panel, a sensing module support member and a sensing module. The sensing module support member comprising: a front part that defines a portion of a front surface of the display apparatus and extends along an edge of the display panel, wherein the front part comprises a transmission part disposition hole in a forward-rearward direction; and a rear protrusion protruding in a rearward direction and coupled to the main frame, wherein the rear protrusion comprises a module cabinet disposition recess adjacent to a rear side of the transmission part disposition hole. The sensing module comprising: a module cabinet configured to be inserted in the module cabinet disposition recess, a transmission part configured to be disposed in the transmission part disposition hole and configured to transfer light incident to a front of the sensing module, and a light receiving part configured to sense the light transferred from the transmission part.

The transmission part disposition hole may correspond to a downwardly recessed portion of the front part at a side adjacent to the display panel.

The module cabinet disposition recess may correspond to a forwardly recessed portion of the rear protrusion.

The rear protrusion and the module cabinet may be configured to be coupled together by an insertion groove engaged with an insertion part, wherein the insertion groove is provided at one of the rear protrusion or the module cabinet and the insertion part is provided at the other of the rear protrusion or the module cabinet.

The one of the rear protrusion or the module cabinet provided with the insertion groove may comprise a first bracket protruding laterally and defining an upper surface of the insertion groove, and a second bracket protruding laterally and defining a lower surface of the insertion groove.

One of a first surface that partitions a side surface of the insertion groove or a second surface that partitions a side surface of the insertion part may be provided with a lateral module cabinet catching recess configured to be engaged with a module cabinet catching protrusion provided at the other of the first surface or the second surface.

The sensing module may comprise a substrate disposed in the module cabinet. The light receiving part may be disposed on the substrate.

The sensing module may comprise a sensing module controller disposed on the substrate and configured to process information sensed by the light receiving part.

The substrate and the module cabinet may be configured to be coupled together by a substrate insertion groove engaged with a substrate insertion part. The substrate insertion groove may be provided at one of the substrate or the module cabinet and the substrate insertion part may be provided at the other of the substrate or the module cabinet. The substrate insertion groove and the substrate insertion part may extend in a forward-rearward direction.

The one of the substrate or the module cabinet comprising the substrate insertion groove may further comprise a third bracket protruding laterally and defining an upper surface of the substrate insertion groove, and a fourth bracket protruding laterally and defining a lower surface of the substrate insertion groove.

One of a first surface that partitions a side surface of the substrate insertion groove or a second surface that partitions a side surface of the substrate insertion part may comprise a substrate catching recess, and the other of the first surface or the second surface may comprise a substrate catching protrusion configured to be engaged with the substrate catching recess.

A front portion of the substrate may be inserted into the module cabinet. A rear portion of the substrate may protrude toward a rear of the main frame and may be angled from the front portion.

The sensing module controller may be disposed on the rear portion of the substrate.

The light receiving part may comprise a plurality of infrared light receivers configured to receive infrared light for remote control of the display apparatus, and an illumination sensor configured to sense illumination intensity of the light transferred from the transmission part. The plurality of infrared light receivers and the illumination sensor may be arranged horizontally when viewed from a front. The sensing module may further comprise a light emitting part configured to emit light and disposed further forward than the infrared light receivers.

The module cabinet may comprise a pair of side parts which are spaced apart from each other to define left and right sides of the module cabinet.

One of the rear protrusion or at least one of the side parts may be provided with an insertion groove configured to be engaged with at least one insertion part disposed on the other of the rear protrusion or the at least one of the side parts.

The display apparatus may further comprise a substrate inserted between the side parts, wherein the light receiving part is coupled to the substrate. One of the substrate or at least one of the side parts may be provided with a substrate insertion groove configured to engage with a substrate insertion part disposed on the other of the substrate or the at least one of the side parts.

The display apparatus may further comprise a display panel support member coupled to the main frame and configured to extend along and fix an edge of the display panel.

The main frame may comprise a main plate coupled to the display panel support member and configured to support the display panel support member.

The display panel support member may be disposed at the edge of the display panel excluding a portion of the edge at which the sensing module support member is disposed. The main frame may comprise a panel support unit disposed at the portion of the edge of the display panel at which the sensing module support member is disposed and configured to fix a rear of the edge of the display panel.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a front view showing a display apparatus according to an embodiment of the present invention and an enlarged front view showing a portion of the display apparatus in which a sensing module is disposed;

FIG. 2 is a sectional perspective view of the display apparatus taken along line S1-S1' of FIG. 2;

FIG. 3 is a rear bottom perspective view of the display apparatus of FIG. 1, showing the state in which a rear case is removed;

FIG. 4 is a sectional conceptual view of the display apparatus taken along line S3-S3' of FIG. 3;

FIG. 5 is an elevation view showing the upper surface of a sensing module support member and a sensing module and a partially enlarged elevation view showing a portion of the display apparatus in which the sensing module is disposed;

FIG. 6 is a perspective view showing the state in which the sensing module support member and the sensing module of FIG. 5 are separated from each other;

FIG. 7 is a perspective view showing the state in which the sensing module support member and the sensing module of FIG. 6 are coupled to each other;

FIG. 8 is a perspective view of the sensing module of FIG. 6 when viewed from a different side;

FIG. 9 is a sectional perspective view of the sensing module taken along line S3-S3' of FIG. 8;

FIG. 10a is a sectional view of the sensing module taken along line S4-S4' of FIG. 8, showing the state in which the sensing module is coupled to the sensing module support member;

FIGS. 10b and 10c are sectional views of the sensing module taken along line S4-S4' of FIG. 8, according to other embodiments;

FIG. 11a is a sectional perspective view of the sensing module taken along line S5-S5' of FIG. 10a;

FIG. 11b is a sectional perspective view of the sensing module taken along line S5-S5' of FIG. 10a, according to other embodiment;

FIG. 12a is a sectional perspective view of the sensing module and the sensing module support member taken along line S6-S6' of FIG. 10a; and FIG. 12b is a sectional perspective view of the sensing module and the sensing module support member taken along line S6-S6' of FIG. 10a, according to other embodiment.

DETAILED DESCRIPTION OF THE PREFERRED EMBODIMENTS

Exemplary embodiments of the present invention will be described with reference to the attached drawings.

In the following description, the terms "forward," "rearward," "leftward," "rightward," "upward," and "downward," which indicate directions, are defined based on forward (F), rearward (R), leftward (Le), rightward (Ri), upward (U), and downward (D) directions as illustrated in the drawings. In this specification, the direction in which a display panel outputs an image is defined as the forward direction, and the direction in which a sensing module is disposed is defined as the downward direction. However, these definitions are given only for clear understanding of the present invention, and the directions may be defined differently depending on the circumstances.

In the following description, the terms "first," "second," "third," and "fourth" are used only to avoid confusion between designated components, and do not indicate the sequence or importance of the components or the relationships between the components. For example, a display apparatus may include only a second component, and may lack a first component.

Referring to FIGS. 1 to 4, a display apparatus according to an embodiment of the present invention includes a display panel 10 for displaying an image. The display panel 10 outputs the image forward. For example, the display panel 10 may be a thin film transistor liquid-crystal display (TFT-LCD) panel.

In the case in which the display panel 10 is an LCD panel, the display apparatus may include a backlight module 20 disposed at the rear of the display panel 10. The backlight module 20 emits light to the display panel 10. The backlight module 20 is fixed to a main frame 30. The backlight module 20 is disposed between the display panel 10 and the main frame 30. For example, the backlight module 20 may include a cold cathode fluorescent lamp (CCFL) or a light emitting diode (LED) as a light source.

The display apparatus includes a main frame 30 disposed at the rear of the display panel 10. The main frame 30 is disposed so as to be spaced apart from the display panel 10. The display apparatus includes a supporter disposed in contact with an external wall or an external floor for supporting the display apparatus. The supporter may be fixed to the main frame 30 in order to support the main frame 30. The main frame 30 supports other parts of the display apparatus. The load of other parts of the display apparatus is transferred to the supporter via the main frame 30, and is transferred to the external wall or the external floor via the supporter.

The display apparatus includes a support member 50 disposed along the edge of the display panel 10. The support member 50 is coupled and fixed to the main frame 30. The rear side part of the support member 50 is coupled and fixed to the side end of the edge of the main frame 30.

The support member 50 may be disposed at the upper side, the lower side, the left side, and the right side of the display panel 10. The support member 50 includes a lower side support member 50a disposed so as to extend along the lower side end of the display panel 10, an upper side support member 50b disposed so as to extend along the upper side end of the display panel 10, a left side support member 50d disposed so as to extend along the left side end of the display panel 10, and a right side support member 50c disposed so as to extend along the right side end of the display panel 10. The upper side support member 50b, the lower side support member 50a, the left side support member 50d, and the right side support member 50c may be provided as separate parts.

The support member 50 includes a sensing module support member 51 for supporting a sensing module 100, a description of which will follow. The support member 50 includes a display panel support member 55 for supporting the display panel 10. At least one selected from among the upper side support member 50b, the lower side support member 50a, the left side support member 50d, and the right side support member 50c constitutes the display panel support member 55. In this embodiment, the lower side support member 50a constitutes the sensing module support member 51, and the upper side support member 50b, the left side support member 50d, and the right side support member 50c constitute the display panel support member 55.

The display apparatus includes a rear case 70 that defines the rear surface of the display apparatus. The rear case 70 is fixed to the main frame 30. The rear case 70 may cover the rear surface of the main frame 30. The rear case 70 covers the rear surface of a controller 80, a description of which will follow.

The display apparatus includes a controller 80 for controlling the output of an image. The controller 80 is fixed to the main frame 30. The display apparatus may include a speaker (not shown). The controller 80 may control an acoustic signal. The controller 80 may control the supply of electric power to the display panel 10. The controller 80 may include an input unit (not shown) for allowing a user to manipulate the display apparatus. The controller 80 may include a main printed circuit board (PCB) (not shown) for processing information.

The display apparatus includes a sensing module 100 for receiving a signal from an external remote controller. The signal from the external remote controller may be an optical signal. For example, the signal from the external remote controller may be an infrared (IR) signal. Upon receiving the optical signal, the controller 80 may control the display apparatus.

Referring to FIGS. 2 to 4, the main frame 30 is coupled to the support member 50 to support the support member 50. The main frame 30 is coupled to the sensing module support member 51 to support the sensing module support member 51. The main frame 30 is coupled to the display panel support member 55 to support the display panel support member 55. The main frame 30 fixes the backlight module 20 to support the backlight module 20. The main frame 30 fixes the controller 80 to support the controller 80. The main frame 30 may dissipate heat generated in the display apparatus.

The main frame 30 includes a main plate 31. The main plate 31 is disposed at the rear of the display panel 10 so as to be spaced apart from the display panel 10. The main plate 31 is disposed at the rear of the backlight module 20. The main plate 31 has a predetermined thickness in the forward-rearward direction. The main plate 31 may be coupled to the support member 50 to support the support member 50. The main plate 31 is coupled to the display panel support member 55 to support the display panel support member 55.

In this embodiment, the main plate 31 extends in the leftward-rightward direction so as to interconnect the left side support member 50d and the right side support member 50c. The main plate 31 extends toward the upper side support member 50b in the upward direction. The main plate 31 extends to a position spaced apart from the lower side support member 50a in the downward direction. The main plate 31 is coupled to the left side support member 50d and the right side support member 50c to support the left side support member 50d and the right side support member 50c. The main plate 31 is coupled to the upper side support member 50b to support the upper side support member 50b. The main plate 31 is coupled to the display panel support member 55 to support the display panel support member 55.

The main frame 30 includes a heat dissipation plate 33. The heat dissipation plate 33 may be thicker than the main plate 31 in the forward-rearward direction. The heat dissipation plate 33 is disposed at the rear of the main plate 31. The heat dissipation plate 33 is coupled to the main plate 31. The heat dissipation plate 33 may protrude forward in the state of surrounding the side end of the edge of the main plate 31 that is adjacent to the sensing module support member 51. In this embodiment, the heat dissipation plate 33 defines a portion protruding forward while surrounding the lower side end of the main plate 31. The heat dissipation plate 33 is coupled to the sensing module support member 51 to support the sensing module support member 51. In this embodiment, the heat dissipation plate 33 is coupled to the lower side support member 50a. The heat dissipation plate 33 is fastened to the sensing module support member 51 via a fastening member 38c.

The main frame 30 includes a panel support unit 35. The panel support unit 35 fixes the rear surface of the edge of the display panel 10. The panel support unit 35 is coupled to the display panel 10 via an attachment member 15 to support the display panel 10. The panel support unit 35 is disposed at a portion of the edge of the display panel at which the sensing module support member is disposed. The panel support unit 35 is disposed along the side end of the display panel 10 in the direction in which the sensing module support member 51 is disposed, among the front, rear, left, and right side ends of the display panel 10. The side end of the display panel 10 in the direction in which the sensing module support member 51 is disposed, among the front, rear, left, and right side ends of the display panel 10, is fixed to the display panel support member 55 via an attachment member.

The panel support unit 35 includes a vertical part 351 disposed so as to be parallel to the rear surface of the display panel 10. The panel support unit 35 includes a horizontal part 353 protruding from the vertical part 351 and extending in the rearward direction. A single member may be bent in order to form the vertical part 351 and the horizontal part 353 of the panel support unit 35.

The vertical part 351 may have a predetermined thickness in the forward-rearward direction. The vertical part 351 defines the front surface of the panel support unit 35 that faces the rear surface of the display panel 10. An attachment member 15 is coupled to the front surface of the vertical part 351, and the rear surface of the display panel 10 is coupled to the front surface of the attachment member 15, whereby the rear surface of the display panel 10 is fixed by the vertical part 351. For example, an ultraviolet (UV) curable resin, such as an epoxy resin, may be used as the attachment member 15. The vertical part 351 is disposed at the rear of the side end of the edge of the display panel 10. The vertical part 351 is disposed at the rear of the display panel 10 so as to be as high as a predetermined height of the side end of the display panel. The vertical part 351 is disposed along the side end of the display panel 10 in the direction in which the sensing module support member 51 is disposed, among the front, rear, left, and right side ends of the display panel 10. The side end of the display panel 10 in the direction in which the display panel support member 55 is disposed, among the front, rear, left, and right side ends of the display panel 10, is fixed to the display panel support member 55, rather than to the vertical part 351.

The horizontal part 353 may have a predetermined thickness in the upward-downward direction. The horizontal part 353 defines the lower surface of the panel support unit 35 that faces the upper surface of the sensing module support member 51. The horizontal part 353 is disposed at one side end of the main frame 30. The horizontal part 353 may be fixed in the state of being in contact with one side end of the heat dissipation plate 33. The horizontal part 353 may be fastened to one end of the heat dissipation plate 33 via a fastening member 38*a*.

The horizontal part 353 protrudes further forward than the front surfaces of the main plate 31 and the heat dissipation plate 33. The vertical part 351 is connected to the front end of the horizontal part 353. A space is defined between the front surfaces of the main plate 31 and the heat dissipation plate 33 and the rear surface of the vertical part 351. The backlight module 20 is disposed in this space. The panel support unit 35 supports the backlight module 20.

In this embodiment, the panel support unit 35 is disposed at the rear of the lower part of the display panel 10. The vertical part 351 is disposed so as to be parallel to the lower part of the display panel 10. The horizontal part 353 is disposed at the lower side end of the main frame 30. The horizontal part 353 is disposed at the lower side end of the heat dissipation plate 33. The backlight module 20 is disposed at the upper side of the horizontal part 353 such that the backlight module 20 is supported.

The main frame 30 may include an auxiliary frame 37. The auxiliary frame 37 fixes other parts to the main frame 30. For example, the auxiliary frame 37 may be fastened to the rear surface of the heat dissipation plate 33, and the main PCB, the speaker, etc. may be fixed to and supported by the auxiliary frame 37. The auxiliary frame 37 may be disposed between the heat dissipation plate 33 and the rear case 70.

The rear case 70 may include a rear part 71 that defines the rear surface of the display apparatus and a lower part 73 that defines the lower surface of the display apparatus. The rear case 70 is fixed to the main frame 30. The rear case 70 may be fastened to the heat dissipation plate 33. The rear case 70 may be configured to cover only a portion of the rear surface of the display apparatus. An inner space is defined between the inner surface of the rear case 70 and the main frame 30, and the controller 80 is disposed in the inner space.

The display panel support member 55 extends along the edge of the display panel 10. The display panel support member 55 is fixed to the main frame 30. The display panel support member 55 fixes the edge of the display panel 10.

The display panel support member 55 includes an edge part 551 that defines the front surface of the edge of the display panel 10 and a display panel fixing part 553 for fixing the edge of the display panel 10. The display panel fixing part 553 is disposed at the rear of the edge of the display panel 10. An attachment member may be coupled to the front surface of the display panel fixing part 553, and the rear surface of the display panel 10 may be coupled to the front surface of the attachment member, whereby the display panel support member 55 may support the edge of the display panel 10.

The display panel support member 55 is disposed at the edge of the display panel 10, excluding the portion at which the sensing module support member 51 is disposed. In this embodiment, the display panel support member 55 is disposed at the edge of the display panel 10 excluding the lower part of the display panel 10.

Referring to FIGS. 3 to 7, the sensing module support member 51 extends along the edge of the display panel 10. The sensing module support member 51 is disposed at only one side of the display panel 10 in the forward, rearward, leftward, and rightward directions. The sensing module support member 51 may be disposed at the edge of the display panel 10 excluding the portion at which the display panel support member 55 is disposed. In this embodiment, the sensing module support member 51 extends along the lower part of the display panel 10.

The sensing module support member 51 includes a front part 511 that defines the front surface thereof and extends along the edge of the display panel. In this embodiment, the front part 511 is disposed at the lower side of the display panel 10. The front part 511 has a transmission part disposition hole 511*a* formed therethrough in the forward-rearward direction. A portion of the front part 511 that is adjacent to the display panel 10 is recessed in the direction perpendicular to the forward-rearward direction, whereby the transmission part disposition hole 511*a* is formed. In this embodiment, the portion of the front part 511 that is adjacent to the display panel 10 is the upper portion of the front part 511, and the upper portion of the front part 511 is recessed downward, whereby the transmission part disposition hole 511*a* is formed.

The sensing module support member 51 includes a rear protrusion 515 protruding toward the rear of the front part 511 so as to be coupled to the main frame 30. The rear protrusion 515 extends along the edge of the display panel 10. The front end of the rear protrusion 515 is coupled to the rear surface of the front part 511. In this embodiment, the rear protrusion 515 extends in the leftward-rightward direction. The rear protrusion 515 has a module cabinet disposition recess 515*a* formed at the rear of the transmission part disposition hole 511*a*. A portion of the rear protrusion 515 is recessed forward, whereby the module cabinet disposition recess 515*a* is formed. The rear end of the rear protrusion 515 is recessed forward, whereby the module cabinet disposition recess 515a is formed. The rear protrusion 515 may be formed in a separated state by the module cabinet disposition recess 515a.

The sensing module support member 51 is fixed to the main frame 30. The rear protrusion 515 includes a fixing part 515c fixed to the main frame 30. In this embodiment, the fixing part 515c protrudes upward. The fixing part 515c protrudes further upward than the remaining part of the rear protrusion 515. The upper surface of the fixing part 515c contacts the lower surface of the main frame 30. The fixing part 515c is fixed to the main frame 30 via a fastening member 38c. The fixing part 515c protrudes upward, and the upper surface of the remaining part of the rear protrusion 515 is disposed so as to be spaced apart from the lower surface of the main frame 30. In addition, the upper end of the front part 511 is disposed so as to be spaced apart from the lower end of the display panel 10.

Referring to FIGS. 5 to 12b, the sensing module 100 includes a substrate 110, on which light receiving parts 150 and 160, a description of which will follow, are disposed. A light emitting part 170, a description of which will follow, is disposed at the substrate 110. A sensing module controller 180, a description of which will follow, is disposed at the substrate 110. The substrate 110 is inserted and disposed between opposite side surfaces of a module cabinet 120, a description of which will follow. The light receiving parts 150 and 160 are fixed to the substrate 110. The light emitting part 170 and the sensing module controller 180 are fixed to the substrate 110. The front portion of the substrate 110 is inserted into the module cabinet 120, and the rear portion of the substrate 110 is disposed at the rear of the module cabinet 120 in the state of not being inserted into the module cabinet 120. The rear portion of the substrate 110 protrudes toward the rear of the module cabinet 120. The rear portion of the substrate 110 is disposed in the same plane as the front portion thereof. The rear portion of the substrate 110 is angled horizontally from the front portion thereof.

The sensing module 100 includes a module cabinet 120, which defines opposite side surfaces thereof. The module cabinet 120 defines at least a portion of the outer surface of the sensing module 100, e.g. opposite side surfaces of the sensing module 100. The module cabinet 120 is inserted and fixed in the module cabinet disposition recess 515a. The module cabinet 120 is coupled to the sensing module support member 51 such that the sensing module 100 is supported.

The module cabinet 120 includes a pair of side parts 121, which are spaced apart from each other to define left and right side surfaces thereof. The substrate 110 may be disposed at the upper part of the module cabinet 120 between the opposite side surfaces of the module cabinet 120. The substrate 110 is disposed between the side parts 121. The module cabinet 120 includes a lower part 123 disposed at the lower side of the substrate 110 so as to be spaced apart from the substrate 110. The module cabinet 120 may include an upper part 125 that defines the upper surface thereof at the front of the substrate 110. The inner space of the sensing module 110 is partitioned by the side parts 121, the lower part 123, and the substrate 110. The upper end of the upper part 125 may be disposed in substantially the same horizontal plane as the upper end of the front part 511, or may be disposed higher than the upper end of the front part 511. The lower end of the lower part 123 may be disposed lower than the lower end of the front part 511.

The sensing module 100 may include a transmission part 140, which is disposed in the transmission part disposition hole 511a. The transmission part 140 transfers light incident to a front of the sensing module 100. The transmission part 140 receives light incident to a front surface of the transmission part 140 and transfers the light inward toward the light receiving parts 150 and 160. The front surface of the transmission part 140 is disposed in substantially the same plane as the front surface of the front part 511. In the case in which the front surface of the transmission part 140 has the same color as the front surface of the front part 511, the transmission part 140 and front part 511 may appear to be integrated.

The transmission part 140 is disposed at the front end of the module cabinet 120. The transmission part 140 is connected to the front ends of the side parts 121, the lower part 123, and the upper part 125. The inner space of the module cabinet 120 is defined at the rear of the transmission part 140.

The sensing module 100 includes light receiving parts 150 and 160 for sensing light transmitted through the transmission part 140. The light receiving parts 150 and 160 are disposed at the substrate 110. The light receiving parts 150 and 160 are fixed to the lower surface of the substrate 110. The light receiving parts 150 and 160 are disposed at the front portion of the substrate 110. The light receiving parts 150 and 160 may include an infrared light receiver 150 for receiving infrared light for remote control. The light receiving parts 150 and 160 may include an illumination sensor 160 for sensing illumination intensity of the transmitted light. The illumination sensor 160 may sense illumination of the transmitted light. A plurality of infrared light receivers 150 may be provided. The infrared light receivers 150 may include a first infrared light receiver 150a and a second infrared light receiver 150b, which are arranged horizontally. When viewed from the front, the infrared light receivers 150 and the illumination sensor 160 are arranged horizontally. The illumination sensor 160, the first infrared light receiver 150a, and the second infrared light receiver 150b may be sequentially arranged horizontally in the state of being spaced apart from each other.

The sensing module 100 includes a light emitting part 170 for emitting light forward. The light emitted by the light emitting part 170 passes through the transmission part 140. The light emitting part 170 is disposed at the substrate 110. The light emitting part 170 is disposed at the lower surface of the substrate 110. The light emitting part 170 is disposed at the front portion of the substrate 110. The light emitting part 170 is disposed further forward than the infrared light receivers 150a and 150b. When viewed from the front, the light emitting part 170 is disposed at the front of the first infrared light receiver 150a. The illumination sensor 160, the first infrared light receiver 150a, and the second infrared light receiver 150b are horizontally arranged in the rear space of the inner space of the module cabinet 120. The light emitting part 170 is disposed in the front space of the inner space of the module cabinet 120. For example, the light emitting part 170 may include an LED.

The sensing module 100 includes a sensing module controller 180 for processing information sensed by the light receiving parts 150 and 160. The sensing module controller 180 processes information sensed by the illumination sensor 160. The sensing module controller 180 controls the operation of the light emitting part 170. The sensing module controller 180, the light receiving parts 150 and 160, and the light emitting part 170 are electrically connected to one another. Wires for electrical connection are disposed on the substrate 110.

The sensing module controller 180 is disposed at the substrate 110. The sensing module controller 180 is disposed on the upper surface of the substrate 110. The sensing module controller 180 is disposed at the rear portion of the substrate 110. The rear portion of the substrate 110 extends to the rear of the main frame 30. The sensing module controller 180 may be disposed at the rear portion of the substrate 110, whereby the sensing module controller 180 may be disposed at the rear of the main frame 30. The rear portion of the substrate 110 is angled from the front portion of the substrate 110 in the leftward direction or in the rightward direction. When viewed from above, the sensing module controller 180 extends in the leftward-rightward direction. The length of the sensing module controller 180 in the leftward-rightward direction is longer than the length of the sensing module controller 180 in the front-rear direction. As a result, it is possible to reduce the thickness of the display apparatus in the forward-rearward direction.

Hereinafter, the structure in which the module cabinet 120 and the sensing module support member 51 are coupled to each other and the structure in which the module cabinet 120 and the substrate 110 are coupled to each other will be described with reference to FIGS. 6 to 12b.

The sensing module support member 51 supports the sensing module 100. The rear protrusion 515 supports the module cabinet 120. The module cabinet 120 is inserted and fixed in the module cabinet disposition recess 515a from the rear to the front thereof. The transmission part 140 is inserted and located in the transmission part disposition hole 511a from the rear to the front thereof. That is, in the assembly process, the sensing module 100 is fixedly disposed by inserting the sensing module 100 into the rear protrusion 414 of the sensing module support member 51 from the rear to the front thereof, without using an additional fastening member.

The transmission part disposition hole 511a may be formed so as to be open at the upper side thereof. The front portions of the side parts 121 are inserted into the transmission part disposition hole 511a. The width of the transmission part disposition hole 511a in the leftward-rightward direction corresponds to the width of the module cabinet 120 in the leftward-rightward direction. The front portion of the lower part 123 is inserted into the transmission part disposition hole 511a. The upper part 125 is disposed in the upper opening of the transmission part disposition hole 511a.

The width of the module cabinet disposition recess 515a in the leftward-rightward direction corresponds to the width of the module cabinet 120 in the leftward-rightward direction. The opposite side surfaces of the module cabinet 120 contact the side end of the rear protrusion 515, which partitions the module cabinet disposition recess 515a.

The rear protrusion 515 and the module cabinet 120 are configured to be coupled together by an insertion groove 130a engaged with an insertion part 515b. The insertion groove 130a is provided at one of the rear protrusion 515 or the module cabinet 120 and the insertion part 515b is provided at the other of the rear protrusion 515 or the module cabinet 120. One of the rear protrusion 515 or at least one of the side parts 121 is provided with the insertion groove 130a configured to be engaged with at least one insertion part 515b disposed on the other of the rear protrusion 515 or the at least one of the side parts 121. At the point at which the rear protrusion 515 contacts the module cabinet 120 in the leftward-rightward direction, one selected from between the rear protrusion 515 and the module cabinet 120 is provided with the insertion groove 130a, which extends in the forward-rearward direction, and the other is provided with the insertion part 515b, which extends in the forward-rearward direction so as to be engaged with the insertion groove 130a. One selected from between the rear protrusion 515 and the side parts 121 is provided with insertion grooves 130a, which extend in the forward-rearward direction, and the other is provided with insertion parts 515b, which extend in the forward-rearward direction so as to be engaged with the insertion grooves 130a. In the assembly process, the insertion part 515b slides along the insertion groove 130a so as to be engaged with the insertion groove 130a. A pair including an insertion part 515b and an insertion groove 130a, which are engaged with each other, is disposed at each of the left and right sides of the module cabinet 120.

The one selected from between the rear protrusion 515 and the module cabinet 120 that is provided with the insertion groove 130a may include a first bracket 131 protruding laterally and defining the upper surface of the insertion groove 130a. The one selected from between the rear protrusion 515 and the module cabinet 120 that is provided with the insertion groove 130a may include a second bracket 133 protruding laterally and defining the lower surface of the insertion groove 130a. The first bracket 131 and the second bracket 133 are disposed so as to be spaced apart from each other in the upward-downward direction. The insertion groove 130a is formed between the first bracket 131 and the second bracket 133. The first bracket 131 partitions the upper side of the insertion groove 130a. The second bracket 133 partitions the lower side of the insertion groove 130a. The first bracket 131 extends in the forward-rearward direction. The second bracket 133 extends in the forward-rearward direction. As a result, the sensing module 100 may slide from the rear to the front of the rear protrusion 515, whereby the sensing module 100 may be fixed.

One of a first surface that partitions a side surface of the insertion groove 130a or a second surface that partitions a side surface of the insertion part 515b is provided with a lateral module cabinet catching recess 515b1 configured to be engaged with a module cabinet catching protrusion 135 provided at the other of the first surface or the second surface. One selected from between the surface that partitions the side surface of the insertion groove 130a and the surface that partitions the side surface of the insertion part 515b is provided with the module cabinet catching recess 515b1, which is formed laterally, and the other is provided with the module cabinet catching protrusion 135, which is engaged with the module cabinet catching recess 515b1. When the sensing module 100 slides from the rear to the front of the rear protrusion 515, therefore, the module cabinet catching protrusion 135 is engaged with the module cabinet catching recess 515b1, whereby the sensing module 100 is fixed such that the sensing module 100 is prevented from escaping rearward from the rear protrusion 515.

In this embodiment referring to FIGS. 5 to 10a, the insertion part 515b is formed on the rear protrusion 515, and the insertion groove 130a is formed in the sensing module 100. The first bracket 131 is formed at the module cabinet 120. The second bracket 133 is formed at the module cabinet 120.

In other embodiment referring to FIG. 10b, the insertion part 515b is formed on the sensing module 100, and the insertion groove 130a is formed in the rear protrusion 515. The first bracket 131 is formed at the rear protrusion 515'. The second bracket 133 is formed at the rear protrusion 515.

In this embodiment referring to FIGS. 5 to 10a and 12a, the module cabinet catching recess 515b1 is formed in the rear protrusion 515, and the module cabinet catching protrusion 135 is formed on the module cabinet 120. In this embodiment referring to FIGS. 5 to 10a and 12a, the module cabinet catching recess 515b1 is formed in a surface that partitions a side surface of the insertion part 515b, and the module cabinet catching protrusion 135 is formed on a surface that partitions a side surface of the insertion groove 130a.

In other embodiment referring to FIG. 12b, the module cabinet catching recess 515b1 is formed in the module cabinet 120, and the module cabinet catching protrusion 135 is formed on the rear protrusion 515. In other embodiment referring to FIG. 12b, the module cabinet catching recess 515b1 is formed in a surface that partitions a side surface of the insertion groove 130a, and the module cabinet catching protrusion 135 is formed on a surface that partitions a side surface of the insertion part 515b.

The module cabinet catching recess 515b1 is formed in the side end of the insertion part 515b. The module cabinet catching protrusion 135 is disposed in the insertion groove 130a. The module cabinet catching protrusion 135 is disposed between the first bracket 131 and the second bracket 133.

In this embodiment, the sensing module 100 includes a module cabinet fixing part 130 for fixing the module cabinet 120 to the rear protrusion 515. The module cabinet 120 includes a module cabinet fixing part 130. The module cabinet fixing part 130 includes a first bracket 131. The module cabinet fixing part 130 includes a second bracket 133. The module cabinet fixing part 130 includes a module cabinet catching protrusion 135. A pair of module cabinet fixing parts 130 is disposed at the opposite side surfaces of the module cabinet 120. A pair of first brackets 131 protrudes from opposite side surfaces of the module cabinet 120. A pair of second brackets 133 protrudes from opposite side surfaces of the module cabinet 120. A pair of insertion grooves 130a is formed in opposite side surfaces of the module cabinet 120. A pair of insertion parts 515b is disposed at opposite sides of the module cabinet disposition recess 515a. Each of the insertion parts 515b is provided with a module cabinet catching recess 515b1.

The width between the left and right inner surfaces of the module cabinet 120 corresponds to the width of the front portion of the substrate 110 in the leftward-rightward direction. The front portion of the substrate 110 contacts the inner surfaces of the opposite sides of the module cabinet 120.

The substrate 110 and the module cabinet 120 are configured to be coupled together by a substrate insertion groove 127 engaged with a substrate insertion part 111. The substrate insertion groove 127 is provided at one of the substrate 110 or the module cabinet 120 and the substrate insertion part 111 is provided at the other of the substrate 110 or the module cabinet 120. The substrate insertion groove 127 and the substrate insertion part 111 extend in a forward-rearward direction. the substrate 110 is inserted between the side parts 121. One of the substrate 110 or at least one of the side parts 121 is provided with the substrate insertion groove 127 configured to engage with the substrate insertion part 111 disposed on the other of the substrate 110 or the at least one of the side parts 121. At the point at which the substrate 110 contacts the module cabinet 120 in the leftward-rightward direction, one selected from between the substrate 110 and the module cabinet 120 is provided with the substrate insertion groove 127, which extends in the forward-rearward direction, and the other is provided with the substrate insertion part 111, which extends in the forward-rearward direction so as to be engaged with the substrate insertion groove 127. One selected from between the substrate and the side parts is provided with substrate insertion grooves, which extend in the forward-rearward direction, and the other is provided with substrate insertion parts, which extend in the forward-rearward direction so as to be engaged with the substrate insertion grooves. In the assembly process, the substrate insertion part 111 slides along the substrate insertion groove 127 so as to be engaged with the substrate insertion groove 127. A pair including a substrate insertion part 111 and a substrate insertion groove 127, which are engaged with each other, is disposed at each of opposite sides of the module cabinet 120.

The one selected from between the substrate 110 and the module cabinet 120 that is provided with the substrate insertion groove 127 may include a third bracket 126a protruding laterally and defining the upper surface of the substrate insertion groove 127. The one selected from between the substrate 110 and the module cabinet 120 that is provided with the substrate insertion groove 127 may include a fourth bracket 126b protruding laterally and defining the lower surface of the substrate insertion groove 127. The third bracket 126a and the fourth bracket 126b are disposed so as to be spaced apart from each other in the upward-downward direction. The substrate insertion groove 127 is formed between the third bracket 126a and the fourth bracket 126b. The third bracket 126a partitions the upper side of the substrate insertion groove 127. The fourth bracket 126b partitions the lower side of the substrate insertion groove 127. The third bracket 126a extends in the forward-rearward direction. The fourth bracket 126b extends in the forward-rearward direction. As a result, the substrate 110 may slide from the rear to the front of the module cabinet 120, whereby the substrate 110 may be fixed.

One of a first surface that partitions a side surface of the substrate insertion groove 127 or a second surface that partitions a side surface of the substrate insertion part 111 comprises a substrate catching recess 110a, and the other of the first surface or the second surface comprises a substrate catching protrusion 126c configured to be engaged with the substrate catching recess 110a. One selected from between the surface that partitions the side surface of the substrate insertion groove 127 and the surface that partitions the side surface of the substrate insertion part 111 is provided with the substrate catching recess 110a, which is formed laterally, and the other is provided with the substrate catching protrusion 126c, which is engaged with the substrate catching recess 110a. When the substrate 110 slides from the rear to the front of the module cabinet 120, therefore, the substrate catching protrusion 126c is engaged with the substrate catching recess 110a, whereby the substrate 110 is fixed such that the substrate 110 is prevented from escaping rearward from the module cabinet 120.

In this embodiment referring to FIGS. 5 to 10a, the substrate insertion part 111 is formed on the substrate 110, and the substrate insertion groove 127 is formed in the module cabinet 120. In this embodiment referring to FIGS. 5 to 10a, the third bracket 126a is formed at the module cabinet 120, and the fourth bracket 126b is formed at the module cabinet 120.

In other embodiment referring to FIG. 10c, the substrate insertion part 111 is formed on the module cabinet 120, and the substrate insertion groove 127 is formed in the substrate 110. In other embodiment referring to FIG. 10c, the third bracket 126a is formed at the substrate 110, and the fourth bracket 126b is formed at the substrate 110.

In this embodiment referring to FIGS. 5 to 10a and 11a, the substrate catching recess 110a is formed in the substrate 110, and the substrate catching protrusion 126c is formed on the module cabinet 120. In this embodiment referring to FIGS. 5 to 10a and 11a, the substrate catching recess 110a is formed in a surface that partitions a side surface of the substrate insertion part 111, and the substrate catching protrusion 126c is formed on a surface that partitions a side surface of the substrate insertion groove 127. The substrate catching protrusion 126c is disposed in the substrate insertion groove 127. The substrate catching protrusion 126c is disposed between the third bracket 126a and the fourth bracket 126b.

In other embodiment referring to FIG. 11b, the substrate catching recess 110a is formed in the module cabinet 120, and the substrate catching protrusion 126c is formed on the substrate 110. In other embodiment referring to FIG. 11b, the substrate catching recess 110a is formed in a surface that partitions a side surface of the substrate insertion groove 127, and the substrate catching protrusion 126c is formed on a surface that partitions a side surface of the substrate insertion part 111. The substrate catching recess 110a is disposed in the substrate insertion groove 127. The substrate catching recess 110a is disposed between the third bracket 126a and the fourth bracket 126b.

In this embodiment, the sensing module 100 includes a substrate fixing part 126 for fixing the substrate 110 to the module cabinet 120. The module cabinet 120 includes a substrate fixing part 126. The substrate fixing part 126 includes a third bracket 126a. The substrate fixing part 126 includes a fourth bracket 126b. The substrate fixing part 126 includes a substrate catching protrusion 126c. A pair of substrate fixing parts 130 is disposed at opposite side surfaces of the module cabinet 120. A pair of third brackets 126a protrudes from the inner surfaces of the opposite sides of the module cabinet 120. A pair of fourth brackets 126b protrudes from the inner surfaces of the opposite sides of the module cabinet 120. A pair of substrate insertion grooves 127 is formed in the inner surfaces of the opposite sides of the module cabinet 120. A pair of substrate insertion parts 111 is disposed at opposite sides of the substrate 110. Each of the substrate insertion parts 111 is provided with a substrate catching recess 110a.

In this embodiment, each of the substrate insertion parts 111 is further provided at the side end thereof with a substrate catching protrusion 110b, in addition to the substrate catching recess 110a. The module cabinet 120 is further provided in the inner surface thereof with a substrate catching recess 126d, which is engaged with the substrate catching protrusion 110b. Specifically, the substrate 110 is provided with a first substrate catching recess 110a and a second substrate catching protrusion 110b, and the module cabinet 120 is provided with a first substrate catching protrusion 126c and a second substrate catching recess 126d. The first substrate catching recess 110a is engaged with the first substrate catching protrusion 126c, and the second substrate catching protrusion 110b is engaged with the second substrate catching recess 126d.

As is apparent from the above description, the present invention has the effect of providing a smooth external appearance of the apparatus and reducing the area of the front surface of the apparatus.

In addition, the present invention has the effect of stably fixing the sensing module using a minimum number of members.

In addition, the present invention has the effect of simplifying the process of assembling the sensing module to the support member and making it easy to fasten the sensing module to the support member without using an additional fastening member.

In addition, the present invention has the effect of improving the performance of the light receiving part and the light emitting part while minimizing the volume of the sensing module based on the disposition of the light receiving part and the light emitting part.

In addition, the present invention has the effect of reducing the width of the display apparatus in the upward-downward direction and the forward-rearward direction based on the shape and disposition of the sensing module.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A display apparatus comprising:
   a display panel;
   a main frame disposed at a rear of the display panel;
   a sensing module support member comprising:
      a front part that defines a portion of a front surface of the display apparatus and extends along an edge of the display panel, wherein the front part comprises a transmission part disposition hole in a forward-rearward direction; and
      a rear protrusion protruding in a rearward direction and coupled to the main frame, wherein the rear protrusion comprises a module cabinet disposition recess adjacent to a rear side of the transmission part disposition hole;
   a sensing module comprising:
      a module cabinet configured to be inserted in the module cabinet disposition recess, wherein the module cabinet comprises a pair of side parts which are spaced apart from each other to define left and right sides of the module cabinet;
      a transmission part configured to be disposed in the transmission part disposition hole and configured to transfer light incident to a front of the sensing module; and
      a light receiving part configured to sense the light transferred from the transmission part; and
   a substrate inserted between the side parts, wherein the light receiving part is coupled to the substrate,
   wherein one of the substrate or at least one of the side parts is provided with a substrate insertion groove configured to engage with a substrate insertion part disposed on the other of the substrate or the at least one of the side parts.

2. The display apparatus according to claim 1, wherein the transmission part disposition hole corresponds to a downwardly recessed portion of the front part at a side adjacent to the display panel.

3. The display apparatus according to claim 1, wherein the module cabinet disposition recess corresponds to a forwardly recessed portion of the rear protrusion.

4. The display apparatus according to claim 1, wherein the rear protrusion and the module cabinet are configured to be coupled together by an insertion groove engaged with an insertion part, wherein the insertion groove is provided at one of the rear protrusion or the module cabinet and the insertion part is provided at the other of the rear protrusion or the module cabinet.

5. The display apparatus according to claim 4, wherein the one of the rear protrusion or the module cabinet provided with the insertion groove comprises:

a first bracket protruding laterally and defining an upper surface of the insertion groove; and a second bracket protruding laterally and defining a lower surface of the insertion groove.

6. The display apparatus according to claim 4, wherein one of a first surface that partitions a side surface of the insertion groove or a second surface that partitions a side surface of the insertion part is provided with a lateral module cabinet catching recess configured to be engaged with a module cabinet catching protrusion provided at the other of the first surface or the second surface.

7. The display apparatus according to claim 1, wherein the light receiving part is disposed on the substrate.

8. The display apparatus according to claim 7, wherein the sensing module comprises a sensing module controller disposed on the substrate and configured to process information sensed by the light receiving part.

9. The display apparatus according to claim 7, wherein the substrate insertion groove and the substrate insertion part extend in a forward-rearward direction.

10. The display apparatus according to claim 9, wherein the one of the substrate or the module cabinet comprising the substrate insertion groove further comprises:

a third bracket protruding laterally and defining an upper surface of the substrate insertion groove; and a fourth bracket protruding laterally and defining a lower surface of the substrate insertion groove.

11. The display apparatus according to claim 9, wherein one of a first surface that partitions a side surface of the substrate insertion groove or a second surface that partitions a side surface of the substrate insertion part comprises a substrate catching recess, and the other of the first surface or the second surface comprises a substrate catching protrusion configured to be engaged with the substrate catching recess.

12. The display apparatus according to claim 7, wherein:

a front portion of the substrate is inserted into the module cabinet; and a rear portion of the substrate protrudes toward a rear of the main frame and is angled from the front portion.

13. The display apparatus according to claim 8, wherein the sensing module controller is disposed on a rear portion of the substrate.

14. The display apparatus according to claim 1, wherein the light receiving part comprises:

a plurality of infrared light receivers configured to receive infrared light for remote control of the display apparatus; and an illumination sensor configured to sense illumination intensity of the light transferred from the transmission part, wherein the plurality of infrared light receivers and the illumination sensor are arranged horizontally when viewed from a front, and wherein the sensing module further comprises a light emitting part configured to emit light and disposed further forward than the infrared light receivers.

15. The display apparatus according to claim 1, wherein one of the rear protrusion or at least one of the side parts is provided with an insertion groove configured to be engaged with at least one insertion part disposed on the other of the rear protrusion or the at least one of the side parts.

16. The display apparatus according to claim 1, further comprising a display panel support member coupled to the main frame and configured to extend along and fix an edge of the display panel.

17. The display apparatus according to claim 16, wherein the main frame comprises a main plate coupled to the display panel support member and configured to support the display panel support member.

18. The display apparatus according to claim 16, wherein:

the display panel support member is disposed at the edge of the display panel excluding a portion of the edge at which the sensing module support member is disposed; and the main frame comprises a panel support unit disposed at the portion of the edge of the display panel at which the sensing module support member is disposed and configured to fix a rear of the edge of the display panel.

* * * * *